United States Patent
Wagner

[11] Patent Number: 6,040,533
[45] Date of Patent: Mar. 21, 2000

[54] SWITCH ARRANGEMENT FOR A VEHICLE SEAT

[75] Inventor: Peer-Oliver Wagner, Biebertal, Germany

[73] Assignee: Bayerische Motoren Werke Aktiengesellschaft, Germany

[21] Appl. No.: 09/114,189

[22] Filed: Jul. 13, 1998

[30] Foreign Application Priority Data

Jul. 11, 1997 [DE] Germany .............. 197 29 866

[51] Int. Cl.⁷ .................................. H01H 9/26
[52] U.S. Cl. .......................... 200/5 A; 200/85 A
[58] Field of Search ................ 200/5 R, 6 R, 200/18, 85 A; 180/333

[56] References Cited

U.S. PATENT DOCUMENTS

| | | | |
|---|---|---|---|
| 4,689,537 | 8/1987 | Mizuta et al. | 318/568 |
| 5,128,500 | 7/1992 | Hirschfeld | 200/5 R |
| 5,278,363 | 1/1994 | Krieg et al. | 200/5 R |
| 5,442,149 | 8/1995 | Sato | 200/5 R |

FOREIGN PATENT DOCUMENTS

| | | |
|---|---|---|
| 2836004 | 3/1980 | Germany . |
| 8516069 | 9/1985 | Germany . |
| 3513050 | 10/1986 | Germany . |
| 3517346 | 11/1986 | Germany . |
| 3632902 | 4/1988 | Germany . |
| 3924292 | 12/1990 | Germany . |
| 3933561 | 1/1991 | Germany . |
| 3933562 | 4/1991 | Germany . |
| 29500869 | 4/1996 | Germany . |

*Primary Examiner*—Michael L. Gellner
*Assistant Examiner*—Nhung Nguyen
*Attorney, Agent, or Firm*—Evenson, McKeown, Edwards & Lenahan, P.L.L.C.

[57] ABSTRACT

A switch system for a vehicle seat for use while adjusting a vehicle seat, is composed essentially of an operating part and individual switch bodies. By adjusting the operating part, the position of the entire vehicle seat (relative to the interior of the vehicle) can be changed. By moving the individual switch bodies located on operating part, the positions of the respective elements of the vehicle seat are changed relative to the vehicle seat. Typical elements of the vehicle seat represented by the switch bodies are a seat cushion, a seat back, and a headrest.

14 Claims, 2 Drawing Sheets

SWITCH ARRANGEMENT FOR A VEHICLE SEAT

BACKGROUND AND SPY OF THE INVENTION

This application claims the priority of German priority document 197 29 866.4, filed Jul. 11, 1997, the disclosure of which is expressly incorporated by reference herein.

The present invention relates to a switch system for a vehicle seat that is adjustable by outside force. The seat has individual switch bodies that symbolize important elements of the vehicle seat. Corresponding movements of the respective elements of the vehicle seat are effected by adjusting the switch bodies.

German patent document DE 85 16 069 U1 discloses a switch system with two switch bodies, which symbolize the seat cushion and/or the seat back of a vehicle seat. By appropriate movement of the switch body for the seat cushion, the vehicle seat can be moved backward and forward and adjusted heightwise. The slope of the seat back can be changed by pivoting the second switch body. In addition, switch systems are known in motor vehicles in which additional seat parts (for example a headrest) can be moved by additional switch bodies.

One disadvantage of the switch system disclosed in DE 85 16 069 U1 is that its operation does not result in a corresponding movement of the seat (or of seat elements) that is completely unambiguous and self-explanatory. Thus, it is basically illogical to change the entire vehicle seat in terms of its lengthwise and vertical position by operating the switch body for the seat cushion. As a result of this use of the switch body for the seat cushion for adjusting the entire vehicle seat, individual adjustment provisions for the seat cushion alone are no longer possible. Such adjustment possibilities can only be implemented by transfer switches or other switch bodies.

Additionally, German patent document DE 39 24 292 C1 discloses a switch system whose individual switch bodies represent the elements of a vehicle seat "in a top view." A switch body for a lumbar support is also provided. As a result of a two-piece design of the switch body for the seat cushion, additional adjustment possibilities are provided. In addition, a transfer switch is provided by which individual switch bodies can be used for a variety of purposes. Another disadvantage of this switch system is its lack of clarity and the absence of a self-evident nature.

It is an object of the present invention to provide a switch system that can be operated in a simple and self-explanatory manner despite a variety of adjustment possibilities.

This and other objects and advantages are achieved by providing a higher-level operating part that represents the entire vehicle seat and with which the basic adjustment of the vehicle seat can be performed. Using the operating part according to the invention, the position of the entire vehicle seat can be adjusted relative to the interior of the vehicle, so that the vehicle occupant can perform all the necessary positioning possibilities for "sitting down" in the vehicle in a physically comfortable manner by operating this operating part alone.

Once a basic position that corresponds to body size has been found, the fine adjustment and comfort adjustment of the seat can be performed later using the individual switch bodies to adapt the contour of the seat to the vehicle occupant. By operating the switch bodies, in fact, only the element of the vehicle seat that the switch body represents is moved, so that the function of the switch system is self-explanatory and unambiguous.

The operating part according to the invention assumes switch functions that so far have had to be handled by the switch bodies. Thus, by virtue of the invention, adjustment functions have been made available for the switch bodies that can be used for expanded adjustment possibilities for the respective seat elements. As a result, additional switches, transfer switches, etc. whose functions must be explained by lettering, symbols, etc., can be eliminated so that a high degree of user-friendliness exists despite a diverse range of possible adjustments.

In an embodiment of the invention, the switch bodies are mounted on the operating part, thus providing an especially compact switch system design. The operating part, so to speak, acts as a baseplate for the switch bodies. The individual switch bodies can symbolically represent the associated seat elements "in a side view" or "in a top view."

In an alternative embodiment of the invention, the switch bodies are located on a fixed panel. Here, the operating part is designed as a frame that at least partially encloses the panel. An advantage of this is a smaller total installation depth of the switch system, because the panel can be depressed in the area of the switch bodies. By having a raised edge area, the panel also protects both the operating part and the switch bodies located inside against damage (by the shoes of an individual getting in when the switch system is installed on the side of a seat, for example). By decoupling the movements of the operating part and the switch bodies, both the operating part and the switch bodies can be connected to a common printed circuit board.

In yet another embodiment of the current invention, the operating part adjusts the entire vehicle seat in the lengthwise direction of the vehicle as well as along the vertical axis of the vehicle. With these two adjustment possibilities, it is possible (as a rule) to adopt a basic position that is appropriate for the body size of the occupant. An occupant will then use the individual switch bodies to adjust the contour of the vehicle seat for direct match to his body contour. In addition to the three adjustment directions parallel to the main axis of the vehicle, it is also possible for the operating part to be made pivotable (in order to tilt the entire vehicle seat).

In still another embodiment of the invention, the switch body for the seat cushion is used to adjust only the seat cushion. This adjustment is performed independently of the adjustment of the entire vehicle seat. This also applies to the adjustment of the seat back, headrest, and other seat elements. Additional switch bodies are of course possible that are associated with corresponding elements of a vehicle seat (for example, a switch body for a lumbar support). Moreover, a horizontally divided seat back can be represented by two switch bodies, so that separate adjustment of the tilt, height, and width of the two seat back sections is possible.

In another embodiment of the present invention an especially advantageous arrangement of a switch body for a lumbar support described. As a result of lowering the switch body, according to the present embodiment, a sufficiently large space is created. This allows operation of the switch body for the seat cushion and the seat back in an ergonomically favorable manner (i.e., by using the finger or thumb) to effect a forward movement of the seat cushion or an upward movement of the seat back.

In yet another embodiment of the present invention, individual switch bodies which are easier to grasp are utilized. A groove-like depression is included on the switch bodies. Further the switch bodies are concave curvatures. In effect, the groove-like depression makes it more difficult for the operator's fingers to slip off and hence provides a greater degree of operating safety. The concave curvature of the switch bodies corresponds to the actual shape of the individual seat elements.

In another embodiment of the present invention, a reflecting surface on the operating part or the panel is provided. As a result of this reflecting surface, it is possible to represent a vehicle seat that has realistic proportions, using relatively small switch bodies. An image that is especially suitable (from a visual standpoint) is obtained when the (previously mentioned) concave curvature is made only "half-sided," so that as a result of the reflection of the operating part, a complete curvature of the seat element in question is obtained.

Other objects, advantages and novel features of the present invention will become apparent from the following detailed description of the invention when considered in conjunction with the accompanying drawings.

DETAILED DESCRIPTION OF THE DRAWINGS

Figure 1:
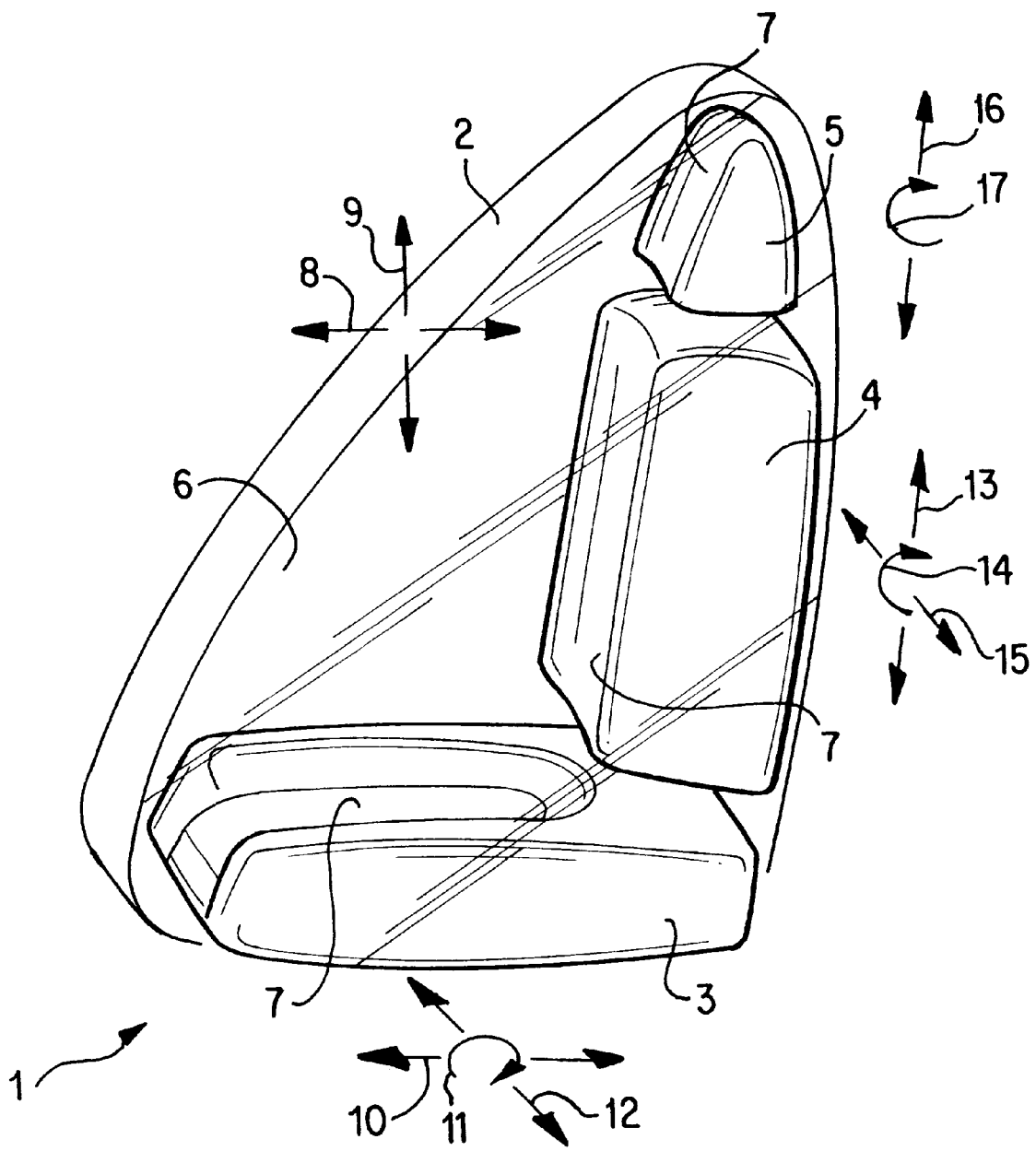
FIG. 1 is a first embodiment of a switch system according to the invention in a perspective view.

The switch system, designated as a whole by 1 as shown in FIG. 1, is composed of an operating part 2 as well as individual switch bodies 3, 4, and 5. Operating part 2 is mounted, for example, on the lateral covering of a vehicle seat or on the interior trim of a vehicle door. Operating part 2 has essentially the shape of a vehicle seat in a side view and is designed so that it is easy to hold ("easy-grip"). Operating part 2 forms a baseplate on which switch bodies 3, 4, and 5 are mounted. Switch bodies 3, 4, and 5 represent the seat cushion, seat back and/or headrest of a vehicle seat "in a side view."

The surface 6 of operating part 2 that faces switch bodies 3, 4, and 5 is made as a mirror, so that the individual switch bodies 3, 4, and 5 are reflected in operating part 2. Consequently, the width of switch bodies 3, 4, and 5 is chosen so that, together with the mirror image, realistic proportions are obtained for the seat cushion, seat back, and headrest. Those surfaces of switch bodies 3, 4, and 5 that correspond to the surfaces of the vehicle seat that come in contact with an occupant have concave depressions 7 that match the curvature of the individual elements of the vehicle seat. Depressions 7 are designed so that they have the shape of a seat cut in half, with the reflected surface 6 of this depression 7 being supplemented to produce a complete curvature.

By using switch system 1 according to the invention, a vehicle seat can be adjusted in a simple manner: the entire seat can be moved backward and forward by moving operating part 2 in the direction of double arrow 8. Accordingly, displacement of operating part 2 in the direction of double arrow 9 causes an upward and downward movement of the entire vehicle seat.

By moving the respective switch bodies 3, 4, and 5, the positions of the individual seat elements can be adjusted individually and independently of one another. By moving switch body 3 in the direction of double arrow 10, the seat depth of the seat cushion can be changed (for example, by adjusting a thigh support). Pivoting switch body 3 according to pivot arrow 11 changes the tilt angle of the seat cushion. In addition, by pulling or pushing in the direction of double arrow 12, the width of the seat cushion can be changed, with the spacing of the sides on the seat cushion and hence the usable seat area being changed.

Accordingly, displacement of switch body 4 in the direction of double arrow 13 produces a vertical change in the seat back relative to the seat cushion. By pivoting, according to the direction of double arrow 14, the tilt angle of the seat back can be changed. In addition, by pulling or pushing in the direction of double arrow 15, the width of the seat back can be changed.

By shifting switch body 5 according to double arrow 16, the height of the headrest is changed. The tilt adjustment is performed by pivoting switch body 5 according to pivot arrow 17.

Figure 2:
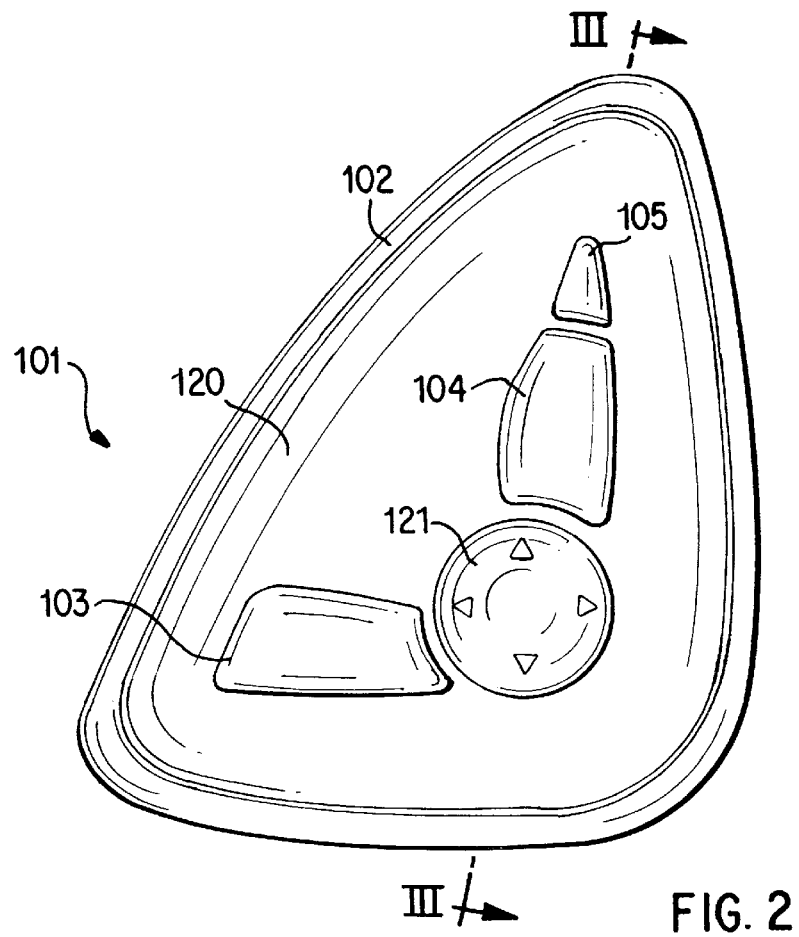
FIG. 2 is a second embodiment of the invention in a top view.
Figure 3:
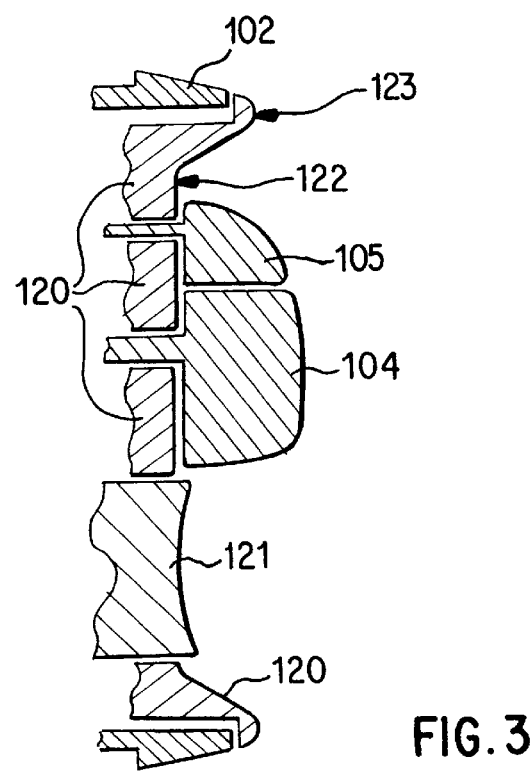
FIG. 3 is a section along section line III—III in FIG. 2.

Switch system 101, according to FIGS. 2 and 3, has a fixed panel 120 through which an additional switch body 121 for a lumbar support is passed next to switch bodies 103, 104, and 105 for the seat cushion, seat back, and headrest. Switch body 121 is located to match the position of a lumbar support in a motor vehicle seat to the correct position for switch system 101 that models the actual passenger seat. In addition, the circular plate of switch body 121 symbolizes the rotational axis of the seat back. Switch body 121 is displaced backward relative to adjacent switch bodies 103 and 104. To achieve a limited overall structural depth, panel 120 is depressed in its middle area 122.

The marginal area 123 of panel 120 is raised to protect switch bodies 103, 104, 105, and 121, and partially covers a frame-shaped operating part 102 for adjusting the entire vehicle seat. Operating part 102 is designed, so to speak, as a frame for panel 120 that is displaceable to a limited degree and is protected by raised marginal area 123 of panel 120.

In motor vehicle seats without lumbar supports, a fixed element can be provided that corresponds to switch body 121. This element symbolizes the rotational axis of the seat back and (because of its limited vertical extent) creates free space for operating switch bodies 103 and 104.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed:

1. A switch arrangement adjusting a vehicle seat in a vehicle, comprising:

a plurality of individual switch bodies, each having a shape which corresponds to a shape of a respective important element of the vehicle seat and being manipulatable to produce a corresponding relative movement of the respective element of the vehicle seat; and an operating part in addition to the switch bodies, which operating part is manipulatable to produce a corresponding movement of the entire vehicle seat;

wherein said switch bodies for adjusting respective elements of the vehicle seat are mounted on the operating part.

2. The switch arrangement according to claim 1, wherein the operating part is movable in a direction of longitudinal and vertical axes of the vehicle, to produce a longitudinal or vertical adjustment of the entire vehicle seat.

3. The switch arrangement according to claim 1, wherein:

the switch bodies symbolize respectively a seat cushion, a seat back, a headrest, and an additional element of the vehicle seat; and a movement of said switch bodies produces an adjustment of at least one of the seat cushion, the seat back, the headrest and the additional seat element relative to the vehicle seat.

4. The switch arrangement according to claim 3, wherein:

an additional switch body for adjusting a lumbar support of a vehicle seat is provided between switch bodies for adjusting a seat cushion and a seat back;

said additional switch body is recessed relative to the other switch bodies, in a direction that is perpendicular to a plane of the operating part.

5. The switch arrangement according to claim 1, wherein the switch bodies have concave depressions on a surface that corresponds to areas of elements of the vehicle seat that face an occupant.

6. A switch arrangement adjusting a vehicle seat in a vehicle, comprising:

a plurality of individual switch bodies, each having a shape which corresponds to a shape of a respective important element of the vehicle seat and being manipulatable to produce a corresponding relative movement of the respective element of the vehicle seat;

an operating part in addition to the switch bodies, which operating part is manipulatable to produce a corresponding movement of the entire vehicle seat; and a panel, said switch bodies for adjusting the respective elements of the vehicle seat being mounted on the panel;

wherein the operating part is a frame which at least partially surrounds the panel.

7. The switch arrangement according to claim 6, wherein:

at least one of the operating part and the panel has a reflecting surface; and the switch bodies are shaped as a vehicle seat cut in half along a longitudinal axis of the vehicle.

8. A switch arrangement for adjusting a vehicle seat of a vehicle, comprising:

a plurality of switch bodies for adjusting elements of the vehicle seat to produce a corresponding adjustment of relative positions of said elements of the vehicle seat; and an operating part in addition to the switch bodies, for producing corresponding adjusting movement of the vehicle seat;

wherein said switch bodies for adjusting elements of the vehicle seat are mounted on the operating part.

9. The switch arrangement according to claim 8, wherein the operating part is movable in a direction of a longitudinal and a vertical axis of the vehicle to produce a longitudinal or vertical adjustment of the entire vehicle seat.

10. The switch arrangement according to claim 8, wherein:

the switch bodies have respective shapes which correspond to a seat cushion, a seat back, a headrest, and another vehicle seat element; and a movement of said switch bodies produces an adjustment of at least one of the seat cushion, the seat back, the headrest and the additional seat element relative to the vehicle seat.

11. The switch arrangement according to claim 10, wherein:

an additional switch body for adjusting a lumbar support of a vehicle seat is provided between switch bodies for adjusting a seat cushion and a seat back; and said additional switch body is recessed relative to the other switch bodies, in a direction that is perpendicular to a plane of the operating part.

12. The switch arrangement according to claim 8, wherein the switch bodies have concave depressions on a surface that corresponds to areas of elements of the vehicle seat that face an occupant.

13. The switch system according to claim 8, wherein:

at least one of the operating part and the panel has a reflecting surface; and the switch bodies are shaped as a vehicle seat cut in half along a longitudinal axis of the vehicle.

14. A switch arrangement for adjusting a vehicle seat of a vehicle, comprising:

a plurality of switch bodies for adjusting elements of the vehicle seat to produce a corresponding adjustment of relative positions of said elements of the vehicle seat;

an operating part in addition to the switch bodies, for producing corresponding adjusting movement of the vehicle seat; and a panel which supports said switch bodies for adjusting the respective elements of the vehicle seat;

wherein the operating part is a frame which at least partially surrounds the panel.

* * * * *